United States Patent

[11] 3,571,503

[72] Inventor Renville H. McMann, Jr.
New Canaan, Conn.
[21] Appl. No. 691,093
[22] Filed Nov. 24, 1967
[45] Patented Mar. 16, 1971
[73] Assignee Columbia Broadcasting Systems, Inc.
New York, N.Y.

[54] METHOD AND APPARATUS FOR SIMULTANEOUSLY RECORDING ON FILM TIME DISPLACED SEGMENTS OF AN ELECTRICAL SIGNAL

8 Claims, 8 Drawing Figs.

[52] U.S. Cl. 178/6.7, 178/5.2
[51] Int. Cl. H04m 5/84, H04n 5/86
[50] Field of Search 178/6.7 (A), 6.7, 5.4 (S), 5.4 (CR), 6.6 (A)

[56] References Cited

UNITED STATES PATENTS

| | | | |
|---|---|---|---|
| 2,928,895 | 3/1960 | Day, Jr. | 178/6.7A |
| 3,152,223 | 10/1964 | Wessels | 178/6.6A |
| 3,189,683 | 6/1965 | Mullin | 178/6.7A |
| 3,255,303 | 6/1966 | Kihara | 178/6.6A |
| 3,407,265 | 10/1968 | Krause | 178/5.4S |
| 3,428,745 | 2/1969 | Coleman et al. | 178/6.6A |
| 3,348,229 | 10/1967 | Freas | 178/6.7 |

FOREIGN PATENTS

| | |
|---|---|
| 722,962 | Great Britain |
| 780,066 | Great Britain |

*Primary Examiner*—Robert L. Griffin
*Assistant Examiner*—Donald E. Stout
*Attorney*—Brumbaugh, Graves, Donohue & Raymond

ABSTRACT: Recording method and apparatus for simultaneously recording on film two time displaced segments of an electrical signal, in which one or more recording beams sweeping transversely of the film are modulated in intensity by the segments, the first of which is delayed in time from its occurrence by an amount equal to the original time displacement between the signal segments. Two recording beams, each modulated by a respective signal segment, or one beam, sequentially modulated with the signal segments, can be employed. Where the signal segments comprise the field signals of a composite television signal, the recording beam(s) may be positioned, to record the corresponding field lines adjacent to one another or, alternatively, in separate frames on the record medium. Both intermittent and continuous film motion may be employed. A variable delay servoloop responsive to the television synchronization pulses maintains the exact delay so that the fields are recorded simultaneously.

Patented March 16, 1971 3,571,503

4 Sheets-Sheet 1

INVENTOR.
RENVILLE H. McMANN, JR.

BY

Brumbaugh, Free, Graves & Donohue his ATTORNEYS

INVENTOR.
RENVILLE H. McMANN, JR.
BY
Brumbaugh, Free, Graves & Donohue
his ATTORNEYS Patented March 16, 1971 3,571,503

4 Sheets-Sheet 3

INVENTOR
RENVILLE H. McMANN, JR.

BY Brumbaugh, Free, Graves & Donohue his ATTORNEYS

Patented March 16, 1971 3,571,503

4 Sheets-Sheet 4

INVENTOR.
RENVILLE H. McMANN, JR.
BY
Brumbaugh, Free, Graves & Donohue
his ATTORNEYS

METHOD AND APPARATUS FOR SIMULTANEOUSLY RECORDING ON FILM TIME DISPLACED SEGMENTS OF AN ELECTRICAL SIGNAL

DISCLOSURE

This invention relates to improved methods and apparatus for simultaneously recording on film two or more time displaced segments of an electrical signal. More particularly, the invention relates to methods and apparatus of this type employing sampled or continuous modulation of a recording beam by the signal segments to be recorded, one of which is delayed by an amount corresponding to the original time displacement.

In recent years, the recording of video and/or audio information for educational, entertainment and commercial, as well as military, purposes has become progressively more widespread. Often, such information is recorded on film or another suitable record medium by a recording beam, such as that from a cathode ray or electron beam tube or a flying spot scanner, which traces out a series of lines transversely across the film. In the case of television signals, recording has been carried out using a stationary line scan in conjunction with a continuously moving film, or using intermittently moving film and a raster scan, so that successive recorded lines on the film are longitudinally displaced. Until the present time, the recording of video information for reproduction by conventional scanning techniques has been done on a real time basis. That is, recording has taken place simultaneously with the presentation of the information to the recording system so that, for example, only one field of a television signal is recorded at any one instant of time on the same record medium. The present invention introduces new approaches, to recording information signals, in which two or more segments, or portions, of the signal may be simultaneously recorded.

One drawback of raster scan recording has been the inadequacy of, or expense involved in, camera equipment required to maintain registration of the raster and film frame area while at the same time rapidly advancing the film from one frame to the next during the small period of time between a pair of television fields. For example, attempts to advance the film through the camera too rapidly result in distortion or tearing of the film about the sprocket holes. Moreover, camera equipment specially designed to accomplish this function tends to be extremely expensive and delicate.

It is therefore among the objects of this invention to provide apparatus and methods for simultaneously recording two or more signals, which avoid the problems and disadvantages associated with known equipment and apparatus.

A further object of the invention is to provide simultaneous recording of two or more signal segments occurring in time displaced relationship.

Another object of the invention is to provide new methods and apparatus for simultaneously recording time displaced signal segments on a continuously or intermittently moving record medium using one or more recording beams.

Still another object of this invention is to provide improved methods and apparatus for recording television signals, in which conventional equipment of ordinary complexity may be used.

In brief, these and other objects of the invention are achieved by delaying the signal, or signal segment, first to occur by an amount equal to the difference in time between its occurrence and the occurrence of one or more following second signals or signal segments. For recording with a single beam, the undelayed second signal or signal segment is periodically sampled with the delayed signal so that the recording beam, as it sweeps across the record medium, is sequentially modulated with the first and second signals, respectively. When two recording beams are used, each beam is continuously modulated with the same signal or signal segment during the recording period. In either case, both intermittent and continuous motion film transport mechanisms can be used.

In one preferred embodiment of the invention, the recording beam may be produced by a conventional cathode ray or electron beam tube of which the beam impinging the film traces out a raster pattern in synchronism with a television signal to be recorded. In this instance, the first signal segment comprises the first field of a composite television signal frame. This field is delayed by an amount sufficient to make it available to the intensity control electrode of the recording beam simultaneously with the second field of the composite television signal frame. The pair of television fields is thus recorded simultaneously in either a single or two separate record medium frame portions. By simultaneous recording, a full television field interval is thus spared in which the record medium may be advanced from one frame to the next.

For a better understanding of these and other aspects of the invention, reference may be made to the following detailed description and to the drawings, in which.

Figures 1, 2A, 2B:
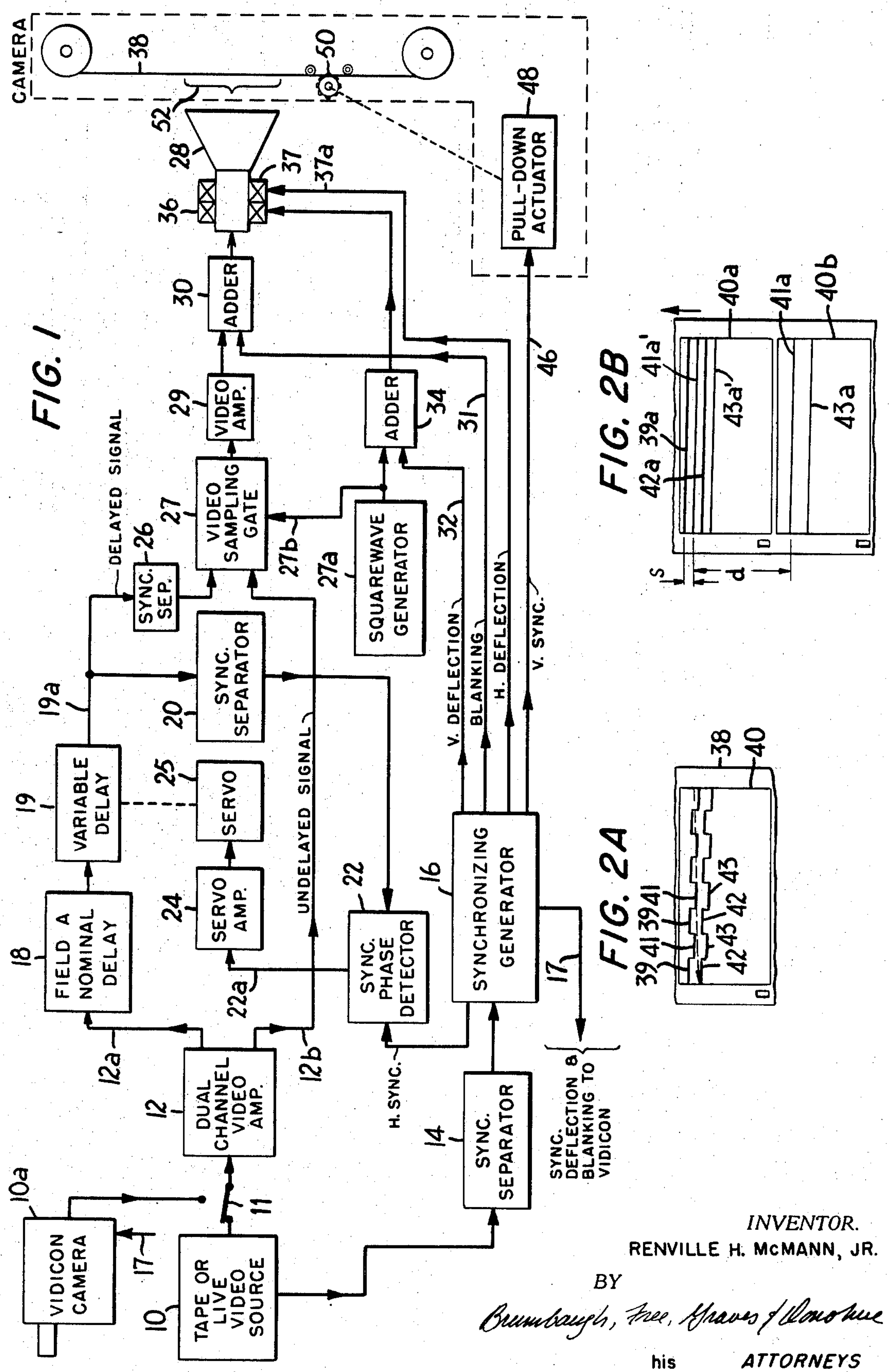
FIG. 1 is a schematic block diagram of recording apparatus according to the invention.
FIG. 2A is a plan view of a record medium to be recorded, showing a typical trace of a single recording beam impinging the record medium for recording sampled television field signals.
FIG. 2B is a plan view of the record medium showing representative traces of two recording beams, each continuously modulated, for laying down the field lines of a television frame signal in interlaced fashion.

For convenience, the apparatus of FIG. 1 and subsequent FIGS. will be described in connection with the recording of television signals derived from any conventional video signal source 10, such as video tape or a live program which presents the subject matter to be recorded as a pair of television field signals A, B. Alternatively, the program material may be derived from a vidicon camera 10*a* viewing images produced by a conventional kinescope projector operating on standard 24 frame/sec. motion picture film. It will be understood that the video signal may be in any suitable form such as a 60 field, 525 line raster (as in the United States) or a 50 field, 625 line raster (as in some European countries). The A and B field signals, of course, make up a television frame and represent the pictorial information in the form of a pair of interlaced raster fields. Each full television field signal may also be considered as a segment of a continuous electrical signal and displaced in time from any previous or subsequent segment. The composite television signal from the video source 10 (or from the vidicon camera 10*a*) is supplied through a selector switch 11 to a dual channel video amplifier 12 providing amplified television signals to a pair of output conductors 12*a* and 12*b*. Additionally, the signal from the video source 10 is fed to a conventional synchronization pulse separator 14, which extracts the synchronization pulses from the composite video signal and feeds them to a conventional synchronizing generator 16 for the synchronous generation of suitable deflection and blanking signals, as well as synchronization signals for the operation of the recording mechanism. When the vidicon camera 10*a* is used instead, the synchronizing generator is internally locked, and the blanking, synchronization and deflection signals are supple supplied to the camera over the conductor 17.

As mentioned earlier, one advantage to be realized by simultaneous recording of the television field pair is the gaining of additional time in which the film or record medium being recorded by may be advanced from one frame to the next. In this instance, it is convenient to delay one of the field signals by essentially the amount of time it takes for the television camera chain to generate one television field. With this amount of delay, an equal amount of time is available for advancement of the film through a distance corresponding to the pitch distance between adjacent film frames or frame pairs. Accordingly, the amplified composite television signal on the conductor 12*a* is fed to a delay unit 18 of conventional design, arbitrarily designated as the "field A" delay, which delays the field A signal by the appropriate amount of time occupied by one television field, and specifically, by an integral number of field lines, say 262 or 263 lines. For conventional television equipment of the type used in the United States, this time is approximately one-sixtieth second (for example, 16.634921 msec. for monochrome and 16.651558 msec. for color programs). From the unit 18 the delayed signal passes through a variable delay unit 19 of any well known type, which further delays the appearance of the signal at the output conductor 19*a* by a small controllable amount, usually 0—50 $\mu$ sec.

With the variable delay 19, the total delay of the field A signal can be controlled with any degree of precision necessary. To this end, the delayed composite field A signal (including the synchronization pulses) at the output of 19*a* is also fed to a second synchronization signal separator 20. The separator 20, in turn, extracts the delayed horizontal synchronization pulses and supplies them to synchronization pulse phase detector 22 which receives as a second input undelayed horizontal synchronization pulses from the generator 16 (which is locked to the synchronization pulses from the separator 14). If the field A signal delay is precisely that of an integral number of field lines totaling approximately one-sixtieth second, the delayed and undelayed synchronization pulses at the phase detector input occur simultaneously and a null, or zero error, condition obtains at the phase detector output 22*a*. Should a time shift from that precise delay occur, however, a phase error exists between the delayed and undelayed sync pulses and an error signal is developed at the output 22*a*. This error signal activates a servochain comprising the servoamplifier 24 and servo 25, the latter being mechanically or otherwise coupled to the variable delay 19, as indicated by the broken line, to readjust the total delay to the desired amount.

It will be observed that the servo loop is completed by the feedback supplied from the sync separator 20. However, open loop control of the variable delay may also be employed. In this event, the input to the sync separator 20 may be taken from the output of the delay unit 18, with the variable delay 19 being used to insert a correction signal proportional to the delay error.

The amplified composite television signals from the second channel of the amplifier 12 (conductor 12*b*) are supplied simultaneously with the delayed field A signal to a video sampling gate 27 through a further synchronization pulse separator 26 which removes the synchronization pulses from the signal to be recorded. The action of the gate 27 is controlled by a signal from the square wave generator 27*a*, which may comprise, for example, a conventional Hartley oscillator with suitable wave-shaping circuits to yield a square waveform with good rise time characteristics. Although a square waveform is preferred, a sine waveform may also be used to control the gate 27. The frequency of the square wave pulses from the generator 17*a* is considerably greater than the horizontal sweep rate of the recording device, here represented by the cathode ray tube (CRT) 28, and preferably at least as great as the highest frequency component of the television field signals to be recorded. A practical figure for the square wave frequency is about 30 megacycles/sec, but a lower frequency that is preferably a multiple of the line recording rate $f_H$ is also satisfactory, for example, 13.56075 mHz. (861 $\times f_H$).

The switching action of the gate 27 in response to the square wave signal on the lead 27*b* is such as to select alternately the delayed field A and undelayed field B signals for passage to a second video amplifier 29, which restores the amplitude of the signals to a level suitable for modulating the intensity of the recording beam of CRT 28. (Since the bandwidth of the recording amplifier 29 following the gate 27 should be about three times the sampling rate to avoid diffusion of the field information sampled, the lower sampling rate may be preferable in order to keep stringent equipment bandwidth requirements to a minimum.) Thus, the gate 27 supplies to the beam intensity control electrode of CRT 28 alternate samples of the entering field A and field B signals. Since the signal appearing on the conductor 19*a* always delayed from its time of occurrence at the video source 10 by the time taken up by one television field (viz., one-sixtieth second in the United States), the amplifier 29 will receive, alternately, samples of the information contained in the field A and field B signals. Added in the adder unit 30 to the signal samples at the output of the amplifier 29 are blanking signals on the conductor 31 from the generator 16. The blanking signals, of course, reduce (or increase) the CRT beam intensity to the "black level" during the horizontal and vertical retrace intervals.

A conventional sawtooth vertical deflection signal provided by the generator 16 on the conductor 32 is combined with a small periodic signal from the square wave generator 27*a* in a second adder unit 34. With this arrangement, the periodic spot wobble signal is superimposed on the vertical deflection signal and the combined signal provided to the longitudinal (vertical) deflection coil 36 of the cathode ray tube. Simultaneously, a horizontal deflection signal at a frequency of, say, 15,750 c.p.s. drives the horizontal deflection coil 37 to sweep the beam in a direction transverse to the direction of motion of the record medium 38 to be recorded. Since the gate 27 is activated at a sampling frequency much greater than the horizontal deflection frequency, the beam from the cathode ray tube will record field A and field B information in a horizontally interlaced series of short line segment as the beam sweeps transversely of the record medium 38.

FIG. 2A shows a typical trace of the recording beam on the record medium 38 produced by the FIG. 1 apparatus. As shown, the beam begins to trace out a line in the upper left-hand corner of a first frame or frame portion 40 of the record medium, the beam being horizontally deflected by the sweep signal on the conductor 37*a*, and simultaneously deflected by the vertical deflection signal of, say, 60 c.p.s. impressed on the coil 36. During this time, the intensity of the beam is modulated by one of the signals, e.g., the field A signal, at the output of the gate 27 to record a line segment 39. After a short period of time equal to the duration of the pulse from the square wave generator 27*a*, the beam receives the field B signal from the gate 27 (which has been activated to select its other input signal by the pulse on the conductor 27*b*) and is intensity-modulated by that signal for a period of time equal to the duration of the following square pulse from the generator 27*a* to record field B information in the line segment 41. In addition, a square wave pulse is added to the vertical deflection sweep signal so that the segment 51 41 is simultaneously lowered to a position approximately midway between the segment 39 and the corresponding segment in the next line. Thereafter, the gate 27 again selects the field A signal, sa and the beam records field A information in the next line segment 39.

This sequence of events continues until a pair of lines representing the information contained in two corresponding lines of a television field pair, has been recorded, the pair being made up of horizontally interlaced and longitudinally displaced series of line segments 39 and 41. The deflection signal from the synchronizing generator 16 then returns the beam to the left of the first frame portion 40, as indicated schematically by the diagonal broken line, but at a longitudinal position displaced downwardly from the first line by an amount equal to the distance between adjacent record lines of a television field. The beam is now modulated alternately with the information in the corresponding successive lines of the the television fields as it is deflected horizontally and vertically to trace out the horizontal-interlaced line segments 42 and 43 making up the second line pairs of recorded information.

During the time interval when the beam returns from one side of the film to the other, it is blanked out by a horizontal blanking pulse on the conductor 31 from the synchronizing generator 16. When a full television frame, i.e., the A and B fields, has been recorded, each frame portion 40 will contain a succession of television field lines. In the United States, where a nominal 525 line television frame format is used, the frame portion 40 will contain, for each television field, an integral number of lines approximating 262½ for example 263 lines. Each line, in turn, is comprised of a multitude of short separated line segments, horizontally interlaced and longitudinally displaced from segments representing information from a different field of the television frame signal. Because the one field is delayed by an integral number of field lines and the recording beam begins each new line trace at the edge of the film frame, the recorded vertical and horizontal interlace of the field lines is properly aligned and correct. Successive fields of each television frame are thus recorded simultaneously on the film 38, and may be reproduced by line or raster scanning, or other suitable methods. Since, during recording, the beam is "wobbled" vertically by the signal from the unit **27*a* during each transverse sweep of the beam, each recorded beam trace can be made substantially contiguous to effectively "fill in" the intertrace spaces, and the effect is to double the number of information-bearing lines in the frame portion 40** to, for example, 525 lines.

Referring again to FIG. 1, the synchronizing generator 16, after the first pair of television fields has been recorded, produces a vertical blanking pulse on the conductor 31 having a duration equal to the time occupied by about a full television field, or about one-sixtieth second. Thus, after the first pair of television fields has been recorded in approximately one-sixtieth second, the recording beam of the tube 28 is blanked out for the remaining period of the television frame (about one-sixtieth second). During this period, a synchronizing pulse, which may occur simultaneously with the vertical synchronizing pulses of the composite signal from the source 10, is provided over the conductor 46 to a suitable actuating mechanism 48 located within the film camera and mechanically linked to the sprocket drive assembly 50 of the camera. This pulse activates the actuator 48 to advance the film 38 through the scanning zone bracketed at 52 for exposure of an adjacent frame 40 (FIG. 2A).

Since the beam from the cathode ray tube 28 is blanked out for nearly one-sixtieth second, the pulldown mechanism 48 has an adequate amount of time in which to advance the film 38 to the desired position before the blanking pulse from the conductor 31 is extinguished. At the end of this period, therefore, the gate 27 again receives simultaneously the delayed first field signal (field A) and undelayed second field signal (field B) of a successive television frame from the video source 10.

From this point forward, the operation of the FIG. 1 system is the same as that explained previously. Thus, the square wave generator **27*a* delivers a square wave signal of, say, 30 Mc/s, which activates the gate 27 to select alternate samples of the field A and field B television signals and provide them to the video amplifier 29. A horizontal deflection signal (e.g., a 15,750 c.p.s. sawtooth waveform) is provided by the generator 16 to the deflection coil 37 over the lead 37*a* to transversely deflect the beam across the scanning zone 52. At the same time, the 60 c.p.s. vertical deflection signal present on the conductor 32 is added in the unit 34 to the signal from the square wave generator 27*a* and fed to the vertical deflection coil 36 of the tube 28. The recording beam, therefore, is alternately modulated in intensity by the signals representing the information in corresponding lines of a television field pair as it sweeps across the scanning zone, and traces out on the film 38 the horizontally interlaced line segment pattern shown in FIG. 2A**.

Figure 3:
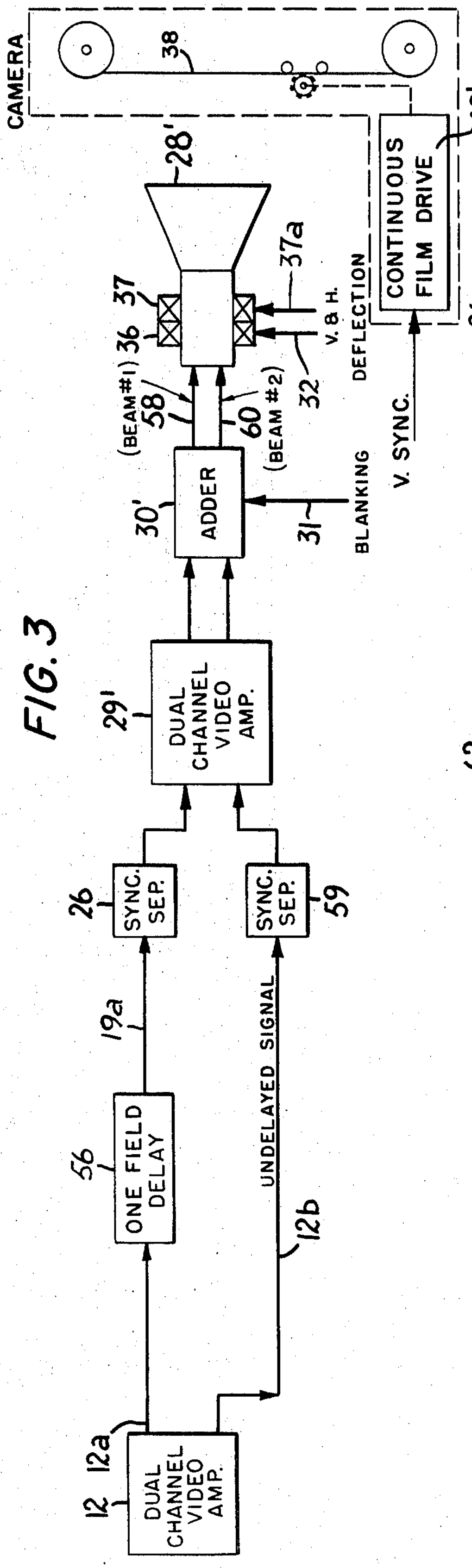
FIG. 3 is a schematic block diagram of a modification of the FIG. 1 apparatus in which two recording beams are employed.

FIG. 3 illustrates an alternate form of recording system using a recording beam tube 28′ having two independent electron beam guns and a continuous motion film transport. In this case, of course, it is not necessary to sample the input signal segments or deflect the beams with the vertical deflection signal, so that the sampling gate 27 and square wave generator are omitted. For convenience, the same reference numerals have been used to identify common units.

In this embodiment, the recording operation is very similar to FIG. 1, and the diagram has been simplified by depicting a single delay unit 56. In this regard, it should be recognized that the delay may be provided by a glass or quartz delay line, but a magnetic disc or drum memory can also be used.

As before, one field signal is delayed by approximately one field, the sync pulses being separated at 26. In this arrangement, however, the delayed signal reaches directly a dual channel video amplifier 29′, and is not sampled. From the amplifier 29′, the delayed signal passes through the adder 30′ (supplying blanking) to the intensity control electrode connection 58 to one beam (Beam 01) of the recording tube 28′. Meanwhile, the undelayed field signal follows a similar path through an independent sync separator 59 and another channel in the amplifier 29′ and adder 30′ to the intensity control connection 60 to a second beam (Beam 02) of the tube 28′.

Similar to the FIG. 1 system, two segments of the original signal are simultaneously developed and presented to the tube 28′. In the FIG. 3 system, however, each segment (television field) continuously modulates one of the beams, and no alternate field blanking is employed so that each complete field is recorded twice on the continuously moving record medium. To accomplish this, the beam spot positions on the medium (38 in FIGS. 1 and 2B) are separated by the distance $s$ between two record lines, or by the distance $d$, equal to the pitch distance between adjacent frames or frame portions **40*a*, 40*b*, plus the line pitch distance $s$ of a completely recorded record medium frame portion. This situation is depicted in FIG. 2B where the lines 39*a* and 41*a* represent corresponding first lines in successive television fields, simultaneously recorded by the two beams in the recording tube 28′. The next pair of corresponding simultaneously recorded lines are designated as 42*a*, 43*a***.

It is apparent that the field A and field B lines will be interlaced, whether the beams are spaced a distance $s$ or $(s+d)$, and each field will be duplicated in an adjacent frame portion. This is readily seen from the following table where $A_1$, $A_2$—and $B_1$, $B_2$—represent first and second fields of successive television frames 1, 2—, and the beam spacing is assumed to be $s$ for simplicity. In FIG. 2B (spacing $s+d$) interlacing is readily apparent between the lines **39*a*, 42*a* and lines 41*a′* and 43*a′*, the latter pair of lines having been previously recorded in the frame 40*a***, with direction of film motion shown by the arrow.

TABLE I

| | Field | Beam #1 | Beam #2 | Fields recorded | Record medium frame portion |
|---|---|---|---|---|---|
| T.V. frame: | | | | | |
| 1 | $A_1$ | | $A_1$ | $A_1$ | 1 |
| | $B_1$ | $A_1$ | $B_1$ | $A_1$, $B_1$ | 2 |
| 2 | $A_2$ | $B_1$ | $A_2$ | $B_1$, $A_2$ | 3 |
| | $B_2$ | $A_2$ | $B_2$ | $A_2$, $B_2$ | 4 |
| 3 | $A_3$ | $B_2$ | $A_3$ | $B_2$, $A_3$ | 5 |
| | $B_3$ | $A_3$ | $B_3$ | $A_3$, $B_3$ | 6 |

The FIG. 3 apparatus has the advantage of providing a continuous duplicated record of information throughout the transverse scan of each line and produces a record medium, or film, which may be copied by standard contact printing methods. Such films are completely compatible with reproduction scanning techniques disclosed, for example, in British Pat. No. 1,040,664. The camera and recording beam can, of course, be combined in a single unit, such as an electron beam tube camera. It is important to recognize that the FIG. 3 system may employ both intermittent, as well as continuous, film motion. For intermittent film motion (raster scan), alternate field blanking is used, as in FIG. 1, and a vertical deflection signal supplied to the coil 36 to displace adjacent recorded lines. Separation of the beam positions on the record medium may, however, be either $s$ or $(s+d)$, as in the case of continuous film motion.

Figure 4:
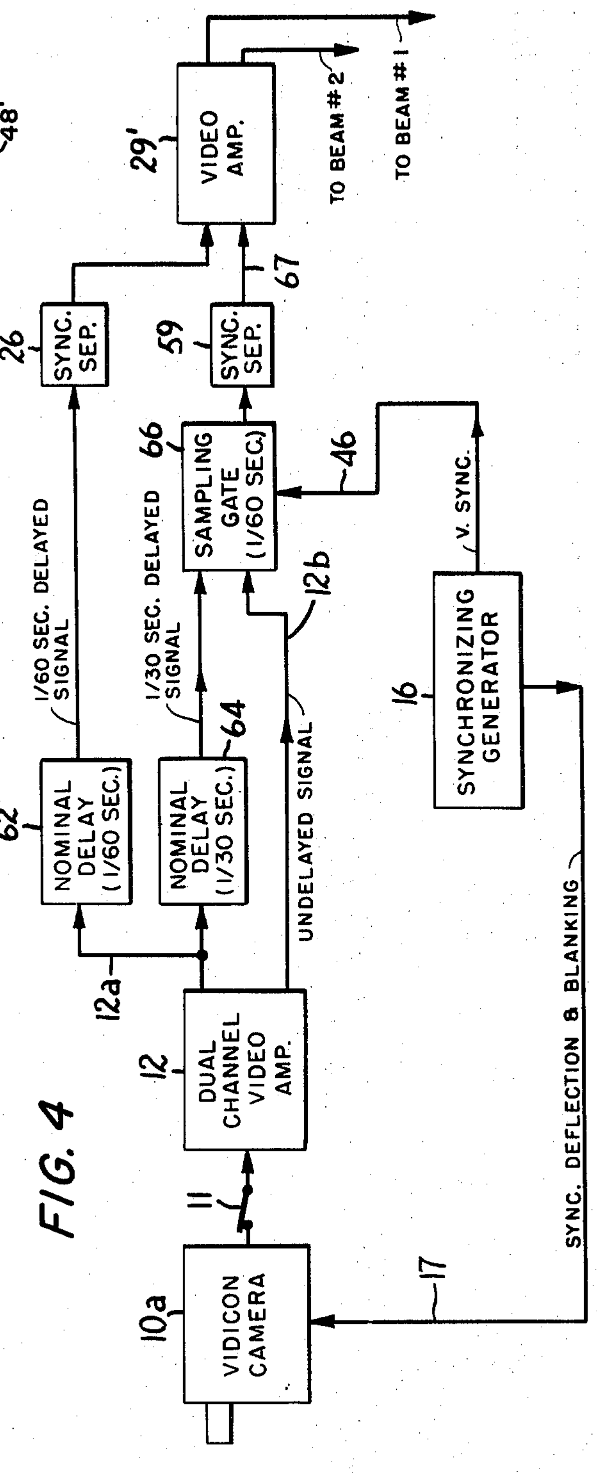
FIG. 4 is a schematic block diagram of a further arrangement of the FIG. 1 apparatus for duplicating recorded frames on a continuously moving record medium.

In FIG. 4, the system is adapted for recording the television field signals on both intermittently and continuously moving film in the format shown in FIG. 2B, each recorded field being duplicated in the time interval reserved for film pulldown in the FIG. 1 apparatus, as in the FIG. 3 system. In this system, however, different time delays are applied to the field signals, which are then sampled in a given sequence so that each frame contains only the information in a corresponding pair of original television fields. As noted above, separation between the beams on the film will be either one frame plus one line ($d+s$ or merely one line ($s$), depending on the film frame format used.

Referring to FIG. 4, the amplified video signal from the camera 10*a* on video output lead 12*a* is supplied to a pair of delay units 62, 64 providing time delays which are consecutive multiples of the time separation between the segments of the video signal to be recorded. In the case of a standard United States television signal, the delay times are nominally one-sixtieth (1 × 1/60) second for the unit 62 and nominally one-thirtieth (2 × 1/60) second for the unit 64. Again, it should be remarked that the delays provided will correspond to an integral number of field lines, and the times one-thirtieth second and one-sixtieth second are therefore approximate. For ease of explanation it is assumed that the delay units 62, 64 comprise, for example, a rotating magnetic storage disc of any well-known type. Any suitable delay means, of course, can be used. The delayed video signal at the output of the delay 62 passes directly through the sync separator 26, to the video amplifier 29′ for distribution to the recording device (not shown). The one-thirtieth second delayed signal from the delay 64, on the other hand, is received at a sampling gate 66, together with the undelayed video signal on the conductor 12*b*. There, those two signals are alternately sampled at the television field rate under control of the vertical sync signal on the conductor 46 so that the input signals to the gate 66 are passed to the video amplifier 29′, over conductor 67 during respective alternate field intervals. In the amplifier 29′, the outputs of the gate 66 and separator 26 are independently strengthened for intensity modulating a respective recording beam.

Since the delay in the unit 64 is one-thirtieth second, the video field signals simultaneously at the inputs to the gate 66 will be an undelayed field signal from conductor 12*b* and a delayed signal representing the corresponding field of the previous television frame. Thus, by way of illustration, if the signal on conductor 12*b* corresponds to field $B_2$, the signal from the delay unit corresponds to field $B_1$ (delayed one-thirtieth second). At the output of the gate 66, therefore, will be an undelayed video field signal (for a duration of one-sixtieth second) followed by the preceding video field signal. Carrying through with the above example, assuming that the gate had previously selected signal $B_2$, the following signal at the output of the gate will be field $A_2$ (delayed one-thirtieth second) which "moves through" the delay 64 to appear at the gate input simultaneously with the appearance of field $A_3$ (undelayed) on conductor 12*b*. Meanwhile, the video signal from the delay unit 62 will correspond to field $A_2$ (delayed one-sixtieth second) during the time the gate 66 has selected field $B_2$, and to field $B_2$ during the time that the gate has selected field $A_2$. The inputs to the amplifier 29′, therefore, will always represent the fields in only one television frame. This result can be readily grasped with the aid of Table II. Although the video field information (A,B) modulating each beam is alternated in the FIG. 4 system, an electronic switch (not shown), operating in synchronism with the field rate, may be employed at the video amplifier output to continuously direct either a field A or field B signal to the same beam-modulating input connection.

TABLE II

| T.V. frame | Field | Gate 66 selects | Beam #1 (1/60 sec. delay) | Beam #2 | Fields recorded | Film frame portion |
|---|---|---|---|---|---|---|
| 1 | $A_1$ | | | | | |
| | $B_1$ | $B_1$ | $A_1$ | $B_1$ | $A_1$, $B_1$ | 1A |
| 2 | $A_2$ | $A_1$ | $B_1$ | $A_1$ | $B_1$, $A_1$ | 1B |
| | $B_2$ | $B_2$ | $A_2$ | $B_2$ | $A_2$, $B_2$ | 2A |
| 3 | $A_3$ | $A_2$ | $B_2$ | $A_2$ | $B_2$, $A_2$ | 2B |
| | $B_3$ | $B_3$ | $A_3$ | $B_3$ | $A_3$, $B_3$ | 3A |
| 4 | $A_4$ | $A_3$ | $B_3$ | $A_3$ | $B_3$, $A_3$ | 3B |
| | $B_4$ | $B_4$ | $A_4$ | $B_4$ | $A_4$, $B_4$ | 4A |

It should be apparent that the systems illustrated in FIGS. 1, 3 and 4 may also be used to record color or monochrome television signals which are coded. For example, in copending application Ser. No. 375,469, now abandoned, it is proposed to record color information as modulation of a color carrier signal having a frequency of about 4.0 Mc/s. In this event, the sampling rate determined by the square wave generator 27*a* (FIG. 1) should be at least as great as the highest frequency component of the color carrier sideband, and preferably more than twice the frequency of the component. For example, assuming the color bandwidth to extend 500 Kc/s. on either side of the 4.0 Mc/s. color carrier, the highest frequency component of the coded color signals is 4.5 Mc/s. and the square wave signal should be at least 9.0 Mc/s. for reasonable recovery of the color carrier sideband frequencies when the record medium is played. Desirably, however, the frequency of the square pulses from the generator 24 will be substantially greater than this figure, say, about 30 Mc/s. Also if desired, the beams in the FIG. 3 and 4 systems, as well, may be given a very limited periodic longitudinal deflection (spot wobbling) to "fill in" the interline spaces on the film frames.

Figure 5:
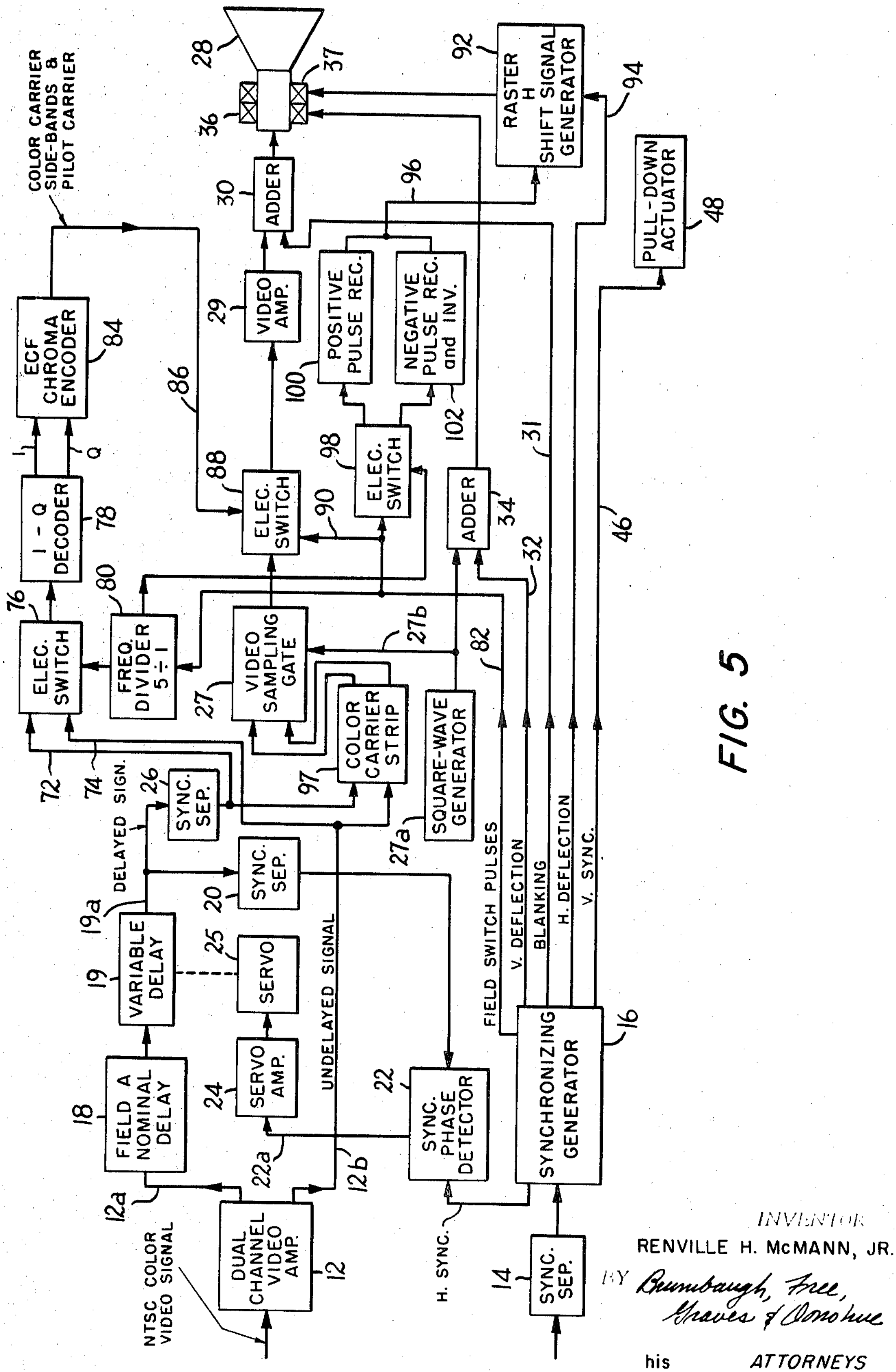
FIG. 5 is a schematic block diagram of a modification of the apparatus of FIG. 1 to permit the recording in adjacent portions of each film frame of brightness and color picture information, respectively, using a single electron beam for recording.

FIG. 5 illustrates how the apparatus shown in FIG. 1 might be modified to record color picture information on film by the techniques disclosed in the copending application Ser. No. 519,106 now abandoned, of Peter C. Goldmark and John M. Hollywood, entitled "Color Film Recording and Reproducing Apparatus," using a single electron beam. According to the teachings of that application, luminance and color information, respectively, in a picture are recorded in monochrome in adjacent portions of the film frame. The color information is recorded in the form of suppressed carrier modulation in transverse lines with a reference carrier at one-half the color carrier frequency recorded in superimposed relation to the carrier modulation recorded in each line.

Figure 5A:
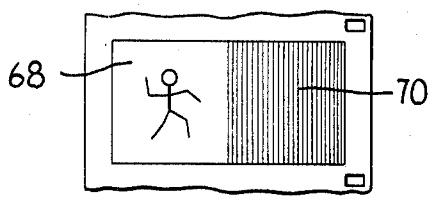
FIG. 5A illustrates schematically a typical film frame recorded by the apparatus of FIG. 5.
Figure 5B:
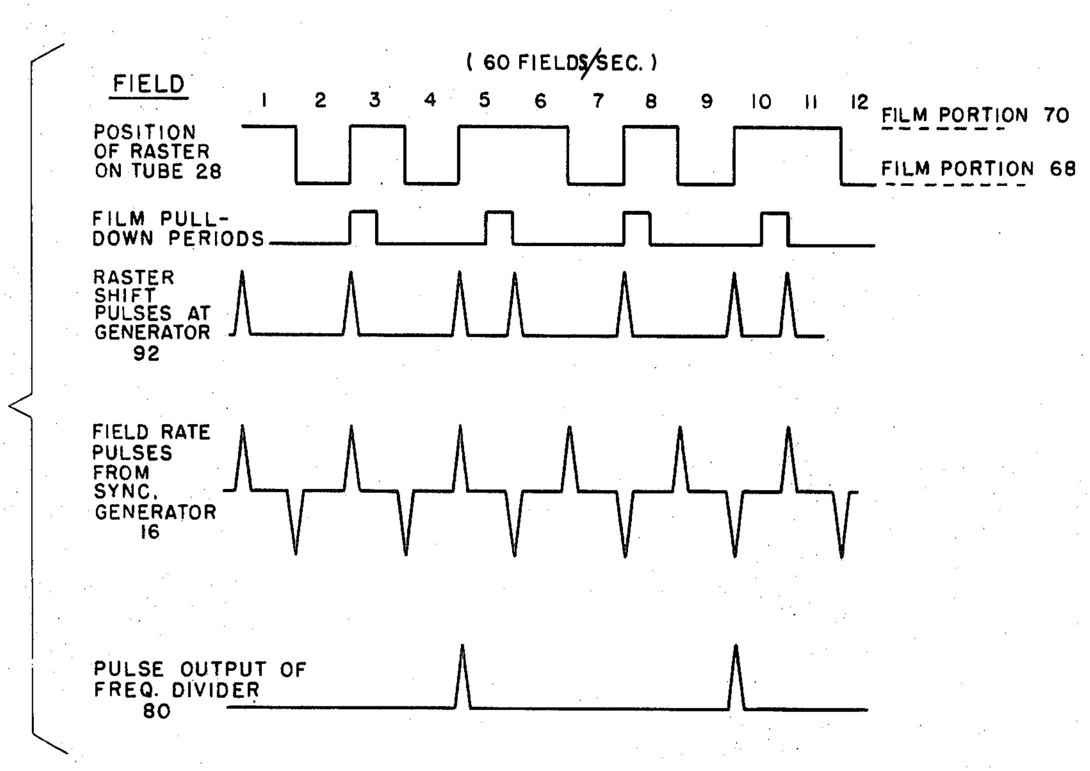
FIG. 5B is a timing diagram that is helpful in understanding the operation of the apparatus of shown in FIG. 5.

A typical film frame of the type disclosed in the aforementioned copending application Ser. No. 519,106 is shown in FIG. 5A, the frame portions 68 and 70 containing the luminance (Y) and chroma information, respectively. The film is intended for operation at conventional motion picture film speed (i.e. 24 frames/sec.). Assuming that the video information is available at the conventional 60 fields per/second, then the dwell and pulldown periods in the recorder should occur at the times indicated in FIG. 5B.

The information to be recorded and the times of recording are specified in Table III below for the first three frames, the general pattern of frames 1 and 2 being repeated every five video fields. The desired record may be produced by the apparatus shown in FIG. 5, which has components in common with the apparatus shown in FIG. 1, designated by the like reference numerals.

TABLE III

| | Recorded in portion 68 | Portion 68 recorded during | Recorded in portion 70 | Portion 70 recorded during |
|---|---|---|---|---|
| Film frame: | | | | |
| 1 | Luminance (Y) from fields 1 and 2 | Field 2 | Chroma from Field 1 | Field 1. |
| 2 | Luminance (Y) from fields 3 and 4 | Field 4 | Chroma from bottom half of Field 3<br>Chroma from top half of Field 4 | Field 3.<br>Field 5. |
| 3 | Luminance (Y) from fields 6 and 7 | Field 7 | Chroma from Field 6 | Field 6. |

Referring now to FIG. 5, a color television signal, which may be the NTSC composite color video signal, is fed to the input of the dual channel video amplifier 12. The delayed and undelayed signal inputs to the video sampling gate 27 are also fed through the conductors 72 and 74 to an electronic switch 76 which is adapted to feed one or the other of these inputs to a conventional I-Q decoder 78. The switch 76 normally passes the undelayed signal to the decoder 78 and passes the delayed signal only when a control signal is received from a frequency divider 80.

The frequency divider 80 receives field switching pulses over the conductor 82 from the synchronizing generator 16 and produces one output control pulse for each five field switching pulses it receives. Accordingly, the electronic switch 76 operates to provide the undelayed video signal to the decoder 78 for four fields and the delayed signal during the fifth field.

The field switching pulses from the synchronizing generator 16 are alternately positive and negative and are synchronized with the beginnings of the respective fields.

The decoder 78 is adapted to extract from the NTSC composite color signal the I and Q components, respectively, which are fed as inputs to an encoder 84 of the type disclosed in the aforementioned copending application Ser. No. 519,106 which provides a suppressed carrier modulation signal representing the color information with a reference carrier at one half the color carrier frequency superimposed thereon.

The output of the encoder 84 is fed through a conductor 86 to an electronic switch 88 which also receives as an input the delayed and undelayed signals from the video sampling gate 27. The electronic switch 88 is adapted to be actuated by field switching pulses received over the conductors 90 and 82 to supply the output of the video sampling gate 27 and the output of the encoder 84 alternately to the video amplifier 29 at the field rate.

In order to record a picture frame as in FIG. 5A, the image of the recording raster produced on the face of the cathode ray tube 28 must coincide with the frame area 70 while the chroma information is being recorded with the frame area 68 while the brightness (Y) information is being recorded.

To this end, the raster image may be positioned initially to coincide with the frame area 70, and be shifted to coincide with the area 68 by a raster shift signal generated by a generator 92 and added to the horizontal deflection signals received from the synchronizing generator 16 over the conductor 94. The raster shift signal is generated only in response to receipt of a control signal over the conductor 96. Normally, for four fields in every five, the control signals are the positive field switching pulses which are supplied to the conductor 96 through an electronic switch 98 and a positive pulse rectifier 100.

However, each time a fifth field pulse is generated by the frequency divider 80, it operates the electronic switch to divert the field switching pulses through the negative pulse rectifier to the conductor 96, in effect reversing the phase of the raster shift cycle. In order that the sampling gate 27 input signals contain only brightness information, a color carrier stripper 97 is provided ahead of the gate 27. The stripper 97 may comprise a low-pass filter for blocking the NTSC color carrier signal frequency.

In operation, assume that video field No. 1 is about to occur, the raster shift generator 92 has just received a positive field switching pulse over the conductor so that the raster image from the cathode ray tube 28 is initially in coincidence with the chroma frame portion 70 (FIG. 5A); the electronic switch 88 is positioned to pass the output of the encoder 84 to the video amplifier 29; and the electronic switch 76 is positioned to pass the undelayed NTSC composite color signal to the decoder 78. Under these conditions (see FIGS. 5B and Table III supra), the CRT 28 will record the chroma information from field No. 1 in the frame portion 70 during field No. 1.

At field No. 2, the absence of a positive field switching pulse on the conductor 96 removes the raster shift signal so that the raster image on the cathode ray tube 28 shifts to coincide with the portion 68 (FIG. 5A): the next (negative) field switching pulse operates the electronic switch 88 to supply the output of the video sampling gate 27 to the video amplifier so that delayed field No. 1 and undelayed field No. 2 are recorded in frame portion 68 during field No. 2 in the manner described above in connection with the apparatus shown in FIG. 1.

At field No. 3, the pulldown actuator 48 is operated to cause pulldown of the film 38 during the first half of field No. 3, when the CRT 28 raster is blanked out (see FIG. 5B); the next (positive) field switching pulse, occurring at the beginning of film pulldown, operates the electronic switch 88 to connect the video amplifier to receive the output of the encoder again and actuates the raster shift generator to shift the raster image into coincidence with the portion 70 of frame No. 2; and, at the end of pulldown, the chroma information from the bottom half of field No. 3 is recorded in the bottom half of the frame portion 70 of frame No. 2.

With the next (negative) field switching pulse the raster shift generator 92 is disabled and the raster image shifts to coincidence with the portion 68 of frame No. 2; the electronic switch 88 again connects the output of the video sampling gate 27 to the video amplifier; and the luminance information from delayed field No. 3 and undelayed field No. 4 is recorded in the frame portion 68 of frame No. 2 during field No. 4.

The next (fifth) field switching pulse operates the raster shift generator 92 to shift the raster image into coincidence with the portion 70 of frame No. 2 and simultaneously causes the frequency divider 80 to generate a pulse which operates the electronic switch 76 to connect the delayed (field No. 4) signal to the decoder 78; the fifth switching pulse also operates the electronic switch 88 to connect the output of the encoder 84 to the video amplifier 29; and the pulldown actuator is actuated to cause pulldown to occur during the bottom half of field No. 5. Accordingly, the top half of field No. 4 is recorded in the top half of frame portion 70 of frame No. 2 during the top half of field No. 5.

The fifth field pulse from the frequency divider 80 also operates the electronic switch 98 to divert the field switching pulses through the negative pulse rectifier and inverter 102 to the conductor 96. The switch 98 remains in this position until the next fifth field pulse is received to restore it to its initial position. Until this happens, the raster shift signal generator 92 is responsive to negative field switching pulses (inverted to positive pulses by the device 102) so that a field No. 6, the raster image does not shift but remains in coincidence with the chroma portion 70 of frame No. 3 so that the chroma information in field No. 6 can be recorded therein during field No. 6 (similar to the recording of the chroma information from field No. 1 in the portion 70 of frame No. 1 during field No. 1). Thereafter, the recording cycle repeats, essentially as described above.

It should be remarked that the concepts involved in recording the video signals from the source 10 may be employed to record audio or other information signals. For example, where the amplitude of a signal is sampled periodically at a given rate, the sampling rate may be effectively doubled by delaying the signal by an amount of time equal to half the period between adjacent cycles of the sampling signal, and then sampling and simultaneously recording the delayed and undelayed signals. Two samples of the original signal are thus simultaneously obtained and recorded in the same amount of time it would ordinarily take to record a single sample. Since the samples represent the amplitudes of time displaced signal segments, a more accurate recorded representation of the signal may be obtained because the sampling rate is effectively doubled.

From the foregoing, it is apparent that the invention provides improved methods and apparatus for the simultaneous recording of two or more signals or signal segments which are relatively displaced in time. The invention is particularly useful in recording television signals in a raster format while at the same time preserving an adequate period of time for advancement of the record medium being recorded, and also particularly useful in duplicating recorded television frames without increasing the time required for recording.

The embodiments of the invention described herein are intended to be illustrative only, and certain modifications and variations, both in form and detail, will occur to those skilled in the art. For example, any of a number of known delay means can be used effectively. Delay units can be electrical, magnetic, or electromechanical. It is moreover obvious that the invention is compatible with several types of program sources, such as film, video tapes and the like. Accordingly, all such modifications and variations are intended to be included within the scope and spirit of the appended claims

I claim:

1. Apparatus for recording on an elongate record medium repeatedly occurring first and second time displaced segments of an electrical video signal, said first and second segments representing alternate television fields of interlaced scanned video information, the apparatus comprising, in combination:

a. means responsive to the electrical video signal for delaying the first signal segment to an output terminal by an amount corresponding to the time displacement between the first and second signal segments;
b. means for moving said record medium continuously in the longitudinal direction through a scanning zone; and
c. recording means, responsive to the delayed first signal segment at the output terminal and to the undelayed second signal segment, for recording said first and second signal segments on said record medium in said scanning zone.

2. The apparatus defined in claim 1, wherein said recording means includes:

1. means for producing a single recording beam arranged to sweep transversely of the record medium in said scanning zone; and
2. means for sequentially modulating the intensity of said beam with the delayed first signal segment and with the undelayed second signal segment as the beam sweeps transversely of the record medium.

3. The apparatus defined in claim 1, wherein said recording means includes:

1. means for simultaneously producing two recording beams arranged to sweep transversely of the record medium in said scanning zone; and
2. means for modulating the intensity of one of said two beams with the delayed first signal segment and the other of said two beams with the undelayed second signal segment as said beams sweep transversely of the record medium.

4. The apparatus defined in claim 1, wherein successive first and second signal segments are recorded in respective first and second frame portions of said record medium, each frame portion comprising a succession of mutually displaced transverse lines, and wherein said recording means is operative to record said successive first and second signal segments at a distance apart equal to the sum of the longitudinal dimension of one of the record medium frame portions and the pitch distance between adjacent record lines.

5. The apparatus defined in claim 1, wherein successive first and second signal segments are recorded in respective first and second successions of mutually displaced transverse lines on the record medium, the individual lines of each succession being interlaced with the lines of the other, and wherein said recording means is operative to record said successive first and second signal segments at a distance apart equal to the longitudinal displacement between adjacent lines of the first and second recorded successions.

6. Apparatus for recording on an elongate record medium repeatedly occurring first and second time displaced segments of an electrical video signal, said first and second segments representing alternate television fields of interlaced scanned video information, the apparatus comprising in combination:

a. means, responsive to the electrical signal, for delaying the first signal segment to first and second terminals by amounts which are consecutive multiples, respectively, of the time displacement between the first and second signal segments;
b. means for advancing the record medium through a scanning zone;
c. means for sequentially selecting the undelayed signal segment and one of the delayed signal segments at the second terminal in synchronism with the rate of occurrence of the signal segments; and
d. recording means, responsive to the delayed signal segment at the first terminal and to the selected signal segment for recording said segments in at least one record line on the record medium.

7. The apparatus defined in claim 6, wherein said advancing means continuously advances the record medium through a scanning zone to record each of the first and second signal segments in two longitudinally displaced frame portions on the record medium.

8. The apparatus defined in claim 6, wherein: said delay means comprises first and second delay units providing time delays of the first segment equal to, respectively, once and twice the time displacement between the first and second segments and said selecting means includes gating means selecting alternately the undelayed second segment and the delayed first segment from the second delay unit for presentation to a modulating input of the recording means.